July 21, 1931.  F. WALLER  1,815,455
METHOD OF PRODUCING MOTION PICTURES
Filed Sept. 3, 1926
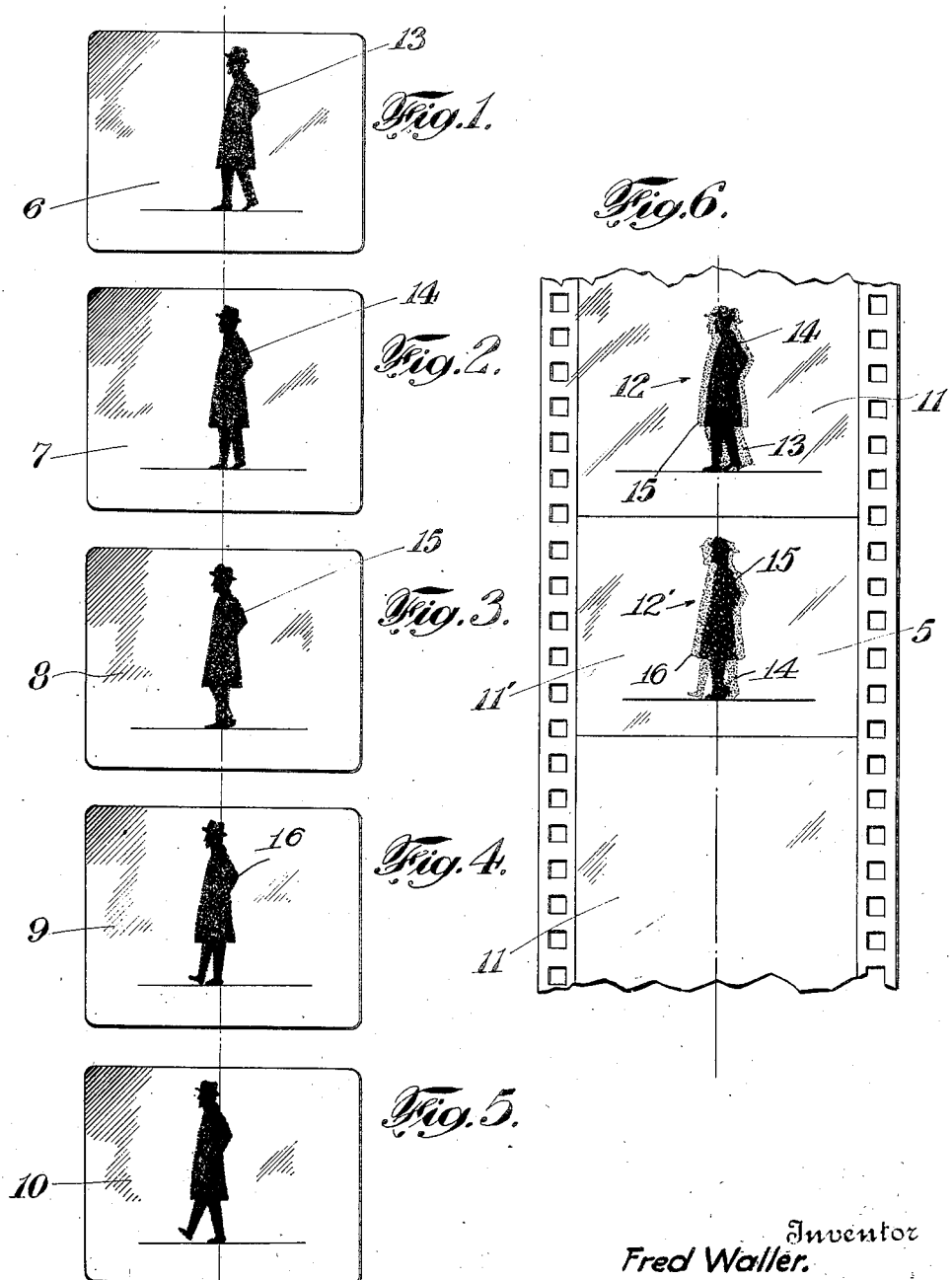
Inventor
Fred Waller.
By his Attorneys
Emery Booth Janney & Varney Patented July 21, 1931

1,815,455

UNITED STATES PATENT OFFICE

FRED WALLER, OF HUNTINGTON, NEW YORK, ASSIGNOR, BY MESNE ASSIGNMENTS, TO PARAMOUNT PUBLIX CORPORATION, A CORPORATION OF NEW YORK

METHOD OF PRODUCING MOTION PICTURES

Application filed September 3, 1926. Serial No. 133,352.

The present invention relates to motion pictures and has for an object to provide an improved method of producing motion picture negatives and projection positives.

It has been found in the taking of motion pictures of moving objects that, if the time of exposure of each image area be reduced to too small a fraction of the time interval between successive exposures, the resulting pictures when projected will be unsatisfactory in that the motion will appear jerky and unnatural. But, if the exposure period be extended to a larger proportion of the interval between succesive exposures, the individual pictures will be blurred, but the picture as projected will appear more natural. The reason for this seems to be that although the individual pictures are blurred, still the mind reconstructs the natural motion more readily than when sharper pictures showing successive phases of action are projected. Similarly, when motion picture positives are produced from separate still pictures which may, for example, be drawings or the like, showing successive phases of action, the results upon projection are jerky and unnatural unless the successive phases of action represented differ by only small increments of movement.

The present invention provides a method of avoiding this appearance of jerky motion even though using still pictures or drawings depicting successive phases of action, wherein a substantial movement is indicated as occurring between successive pictures. The method in its preferred embodiment involves producing what for convenience may be termed a "blur" on each image area of the motion picture positive, especially on that part of the image area which depicts the more rapidly moving part of the object.

The nature and objects of the invention will be better understood from a description of a particular illustrative embodiment of the invention for the purposes of which description reference should be had to the accompanying drawings forming a part hereof and in which—

Figures 1, 2, 3, 4, and 5 are views of separate drawings showing successive phases of action.

Figure 6 is a view of a projection positive produced in accordance with the present invention and showing an image area on which the pictures of Figs. 1 to 5 are reproduced.

The film 5 shown for the purpose of illustrating the invention is a projection positive which has been produced by photographing upon successive image areas of a suitable motion picture negative a series of drawings such as the drawings 6, 7, 8, 9, and 10, showing successive phases of action and then printing the projection positive from such negative in the usual manner. A view of the negative would add nothing to the clearness of the present disclosure and, therefore, it has been omitted.

If each successive image area of the projection positive contained only one sharp image of one phase of action, then upon projection the resultant moving picture would appear jerky, but if the image in each image area is somewhat blurred, especially such portions of the image as depict rapidly moving portions of the object, then the motion picture as projected will appear to represent natural motion.

This blurring of the individual images may conveniently be accomplished by reproducing in each image area of the negative, and of the positive printed therefrom, a principal image representing the phase of action for that image area and two secondary images, one secondary image representing a preceding phase of the action and one representing a succeeding phase of the action. Referring more particularly to Fig. 6, in the image area 11, for example, the image 12 may be treated as consisting of three superposed images 13, 14, and 15 corresponding to the drawings 6, 7 and 8 of which the principal image 14 may have been produced on the negative from the drawing 7 by an exposure of, for example, one-half of the total normal exposure period, and the secondary images 13 and 15 may have been produced from the drawings 6 and 8 by an exposure of one-quarter of the total normal exposure period. By exposure of the negative in this manner, each image area, as a whole, will be given the normal exposure, but those portions of the image which represent moving parts of the object will be exposed only partially in a manner to produce the desired blur.

In the image area 11' shown in Fig. 6 I have illustrated the relative positions of an image 12' in a succeeding frame on the positive. This image like the image in the preceding image area consists of three superimposed images 14, 15 and 16 and corresponds to drawings 7, 8 and 9 of which the principal image 15 may have been produced on the negative from the drawing 8 and the secondary images 14 and 16 may have been produced from the drawings 7 and 9 in the same manner as the image 12 was produced in the preceding image area.

Ordinarily, each successive picture of the series of pictures used in producing the negative will be used to produce the principal image of one of the successive image areas of the negative, but, obviously, in some cases it may be desirable to use, for example, only each alternate picture in the series for producing a principal image, intermediate pictures being used only to produce secondary images causing the blurred effect desired.

In the arrangement herein particularly described, each composite image is shown as consisting of three superposed images, but, obviously, in special cases, because of the character of the motion represented, it may be desirable to form each composite image of a larger number of superposed images. Ordinarily an odd number of images will be superposed in forming the composite image, and ordinarily, also, the same number of preceding and succeeding images will be used, but this, of course, is not essential. In any event, the total time of exposure of all of the pictures exposed on each image area of the negative should be substantially equal to one normal exposure period. For example, if five images are to be exposed, they may be exposed respectively 1/10, 2/10, 4/10, 2/10 and 1/10 of the normal exposure period. The motion picture positive produced by the method described will show upon projection a natural movement of the character desired.

The description of the particular selected embodiment is illustrative merely and is not intended as defining the limits of the invention.

I claim—

1. A motion picture film comprising a plurality of frames, each frame bearing images of successive phases of action of a subject, the images on each frame being of different degrees of intensity to provide a principal image and a secondary image, the principal image on one frame appearing as a secondary image on a succeeding frame.

2. In the production of motion picture films the method which comprises exposing different portions of the frame of a film for predetermined fractions of the normal exposure period to successive phases of action of a subject, to produce on said frame, in different degrees of intensity, images of the said successive phases of action, exposing different portions of another frame of the film for predetermined fractions of the normal exposure period to successive phases of action of the subject, to produce on said frame images of different degrees of intensity, the longest exposure of the second frame being made to the same phase of action as the shorter exposure when exposing the first frame.

3. In the production of motion picture films the method which comprises exposing different portions of the frame of a film for predetermined fractions of the normal exposure period to successive phases of action of a subject, to produce on said frame, in different degrees of intensity, images of the said successive phases of action, exposing different portions of another frame of the film for predetermined fractions of the normal exposure period to successive phases of action of the subject to produce on said frame images of different degrees of intensity, the longest exposure of the second frame being made to the same phase of action as the shorter exposure when exposing the first frame and the shorter exposure of the second frame being made to the same phase of action as the longer exposure when exposing the first frame.

In testimony whereof, I have signed my name to this specification this 23rd day of August, 1926.

FRED WALLER.